(12) United States Patent
Nicol et al.

(10) Patent No.: US 10,999,006 B2
(45) Date of Patent: May 4, 2021

(54) COMMUNICATIONS HAVING REDUCED LATENCY

(71) Applicant: HEWLETT PACKARD ENTERPRISE DEVELOPMENT LP, Houston, TX (US)

(72) Inventors: Russell L. Nicol, Chippewa Falls, WI (US); John F. De Ryckere, Chippewa Falls, WI (US); Joseph M. Placek, Chippewa Falls, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/270,862

(22) Filed: Feb. 8, 2019

(65) Prior Publication Data
US 2020/0259590 A1     Aug. 13, 2020

(51) Int. Cl.
*H04L 1/00*     (2006.01)
*H04L 1/18*     (2006.01)
(Continued)

(52) U.S. Cl.
CPC .............. *H04L 1/0045* (2013.01); *H04L 1/08* (2013.01); *H04L 1/1812* (2013.01); *H04L 1/1864* (2013.01)

(58) Field of Classification Search
None
See application file for complete search history.

(56) References Cited

U.S. PATENT DOCUMENTS 6,314,535 B1 * 11/2001 Morris .................. H03M 13/03
370/468
6,421,803 B1 * 7/2002 Persson ................. H04L 1/1812
714/748

(Continued)

FOREIGN PATENT DOCUMENTS

WO     WO-2018007813 A1     1/2018
WO     WO-2018229168 A2     12/2018

OTHER PUBLICATIONS

Wang et al., Analysis and comparison of FEC and FEC-ARQ protection schemes based on RS and Raptor code, IEEE, Conference Paper, pp. 1-6 (Year: 2010).*

(Continued)

*Primary Examiner* — April Y Blair
*Assistant Examiner* — Dipakkumar B Gandhi
(74) *Attorney, Agent, or Firm* — Nolte Lackenbach Siegel (57) ABSTRACT

Methods and devices for reducing the latency associated with retransmitting data packets are provided. A device used to receive data packets may include physical layer circuitry and data link layer circuitry communicatively coupled to the physical layer circuitry. The data link layer circuitry may include an Automatic Repeat reQuest (ARQ) processing circuit to send requests for retransmitting data packets. The data link layer circuitry may also include a Forward Error Correction (FEC) processing circuit to receive decoded data packets from the physical layer circuitry, to perform error correction on packets received by the physical layer circuitry, and to provide a correction status signal to the ARQ processing circuit indicating whether or not a particular decoded data packet received from the physical layer circuitry contains one or more incurable errors.

18 Claims, 6 Drawing Sheets

(51) Int. Cl.
   *H04L 1/08* (2006.01)
   *H04L 1/22* (2006.01)

(56) References Cited

U.S. PATENT DOCUMENTS

| | | | |
|---|---|---|---|
| 6,615,382 B1 | 9/2003 | Kang et al. | |
| 6,760,860 B1* | 7/2004 | Fong | H04L 1/16 370/474 |
| 6,868,520 B1* | 3/2005 | Fauconnier | H04L 1/0041 714/790 |
| 7,904,779 B2 | 3/2011 | Belogolovy et al. | |
| 2008/0022181 A1* | 1/2008 | Belogolovy | H04L 1/1812 714/751 |
| 2010/0281322 A1* | 11/2010 | Park | H04L 1/1825 714/748 |
| 2012/0131210 A1* | 5/2012 | Hegde | H04L 61/6063 709/228 |
| 2017/0201350 A1* | 7/2017 | Mula | H04L 1/0045 |

OTHER PUBLICATIONS

Shribala et al., Multiple Error Correction binary channel coding scheme, IEEE, Conference Paper, pp. 10-16. (Year: 2013).*

National Institute of Technology Patna, An Efficient Forward Error Correction Scheme for Wireless Sensor Network, 2012, pp. 1-6, Retrieved from the Internet on Jan. 9, 2019 from URL:<core.ac.uk/download/pdf/82477513.pdf>.

* cited by examiner

COMMUNICATIONS HAVING REDUCED LATENCY

BACKGROUND

The Open System Interconnection (OSI) communications model structures networked communications according to a seven-layer protocol. Each of these seven layers is tasked with performing a specific set of operations. For example, the lowest layer (i.e., PHYsical layer, or "PHY") is responsible for receiving data packets in some modulated form, then decoding each received data packet into a stream of individual bits. Using these streams of individual bits, the upper six layers may perform their assigned tasks. For example, the Data Link Layer, which is placed directly above the PHYsical layer in the OSI model, may be responsible for assuring that decoded data packets received from the PHYsical layer are error-free before providing the extracted data to the upper OSI layers.

BRIEF DESCRIPTION OF THE DRAWINGS

Various examples of this disclosure that are proposed as examples will be described in detail with reference to the following figures, wherein like numerals reference like elements, and wherein.

DETAILED DESCRIPTION

The methods and systems disclosed below may be described generally, as well as described in terms of specific examples. For instances where references are made to detailed examples, it is noted that any of the underlying principles described are not to be limited to a single example but may be expanded for use with any of the other methods and systems described herein as will be understood by one of ordinary skill in the art unless otherwise specifically stated.

Automatic Repeat reQuest, or "ARQ," (also known as automatic repeat query) refers to an error-control method for data transmission that uses some form of acknowledgement feedback (i.e., signals sent by a receiver to a transmitter that indicate whether or not a particular packet was received without errors). In some example communication schemes, if a transmitter does not receive some form of timely acknowledgment from a receiver, the transmitter will retransmit a data packet or group of data packets (e.g., a "data package") until some form of appropriate acknowledgment is received or until some predefined number of retransmissions is exceeded. Generally, ARQ protocols use some form of error detection (e.g., a CRC protocol) to determine whether one or more errors can be found in a given data packet or group of data packets.

The term "error detection" refers to any number of techniques usable to determine whether a packet (or some other block of digital data) has some form of error. Error detection can be used in any digital communications or digital data storage system, and generally uses a modest amount of resources. One form of error detection is known as a "parity bit," or "check bit," which is a single bit added to a string of bits to ensure that the total number of 1-bits in the string is either even or odd. Parity bits are perhaps the simplest form of useful error detecting code. However, parity bit codes are generally useful when bit errors are rare and it is highly unlikely that multiple bit errors will occur in a given packet. Another form of error detection is known as a cyclic redundancy check (CRC), which is an approach commonly used in networked communications and storage devices. CRC approaches are widely used because they are simple to implement, easy to analyze, and good at detecting errors caused by noise in transmission channels/mediums and storage devices. Further, CRCs are far more robust at detecting errors in noisy environments that parity codes.

The term "Forward Error Correction" (FEC) refers to any one of a number of digital processing techniques used to enhance data reliability by introducing redundant data prior to data transmission or data storage. Such redundant data, sometimes referred to as "error correcting code" or "error correcting coding," provides a receiver with the ability to correct errors without requiring a retransmission of data. While some FEC techniques (e.g., Hamming codes) are relatively simple, other FEC codes are quite complex and may consume considerable processing time to perform.

The term "Hybrid Automatic Repeat reQuest" (also "hybrid ARQ" or "HARQ") refers to a combination of FEC coding and ARQ-based retransmissions. In standard ARQ, redundant bits are added to data to be transmitted using an error-detecting (not error-correction) code, such as a CRC.

In contrast to ARQ, in Hybrid ARQ the original data is encoded with some form of FEC coding, and any parity bits are either immediately sent along with the message or only transmitted upon request when a receiver detects an erroneous message. In some examples, separate error-detection coding may be omitted when a code is used that can perform both FEC and error detection, such as a Reed-Solomon code. Further, in other examples, error detection may be performed on a data packet basis while FEC may be performed on a data package basis. By way of example, if a data package consists of exactly four data packets, each data packet may have its own CRC (or other error-detection code) while the data package as a whole uses one FEC.

In practice FEC schemes are placed in the Physical layer or between the Data Link Layer and Physical Layer of an OSI channel design. Accordingly, the effect on system bandwidth and HARQ latency is directly related to the correction capabilities that a particular FEC protocol can provide and the processing resources the particular FEC protocol requires. For example, bandwidth is negatively affected by an increasing number of redundant bits used for error correction to support an FEC scheme. Similarly, HARQ latency is impacted based on the logic complexity (e.g., processing time) of an FEC algorithm.

When FEC processing is performed upstream from ARQ processing (e.g., is performed in the physical layer or between the physical layer and data link later), FEC processing and ARQ processing may be performed in a series fashion. As a result a situation may arise where FEC processing may be completed before the (shorter) ARQ processing begins. This series processing approach may be further aggravated by any communication protocol barriers inherent between OSI layers.

In order to address the negative effects of series FEC and ARQ processing, the disclosed methods and systems propose moving the FEC processing into the Data Link Layer to allow any FEC circuitry to interact directly with ARQ protocol circuitry. One innovation associated with such a move is that, as is discussed below, FEC and ARQ processing may take the form of parallel (or near parallel) processing, which in turn removes a bottleneck in the HARQ process inherent in series FEC/ARQ processing. That is, rather than allow a more time consuming FEC process to be conducted on a data packet/data package before an ARQ error detection process begins, the ARQ error detection process and FEC process may occur in parallel.

Thus, in certain embodiments when there are no errors detected in a data packet/data package according to an AR error-detection process, any ongoing FEC process may be stopped, an appropriate HARQ acknowledgment signal may be sent to the transmitter of the data packet/data package, and the data within the data packet/data package may be expedited to the upper OSI layers for further processing.

However, even in a worst-case scenario when a data packet/data package is corrupted beyond repair, total processing time is reduced by virtue of parallel processing.

To take further advantage of the parallel ARQ/FEC processing a special receive buffer circuit is provided. While the receive buffer circuit plays no part in providing HARQ responses to a transmitter, the receive buffer circuit allows data extracted from any number of packets to be temporarily stored until ARQ processing and/or FEC processing is completed.

Assuming that extracted data from a particular data packet/data package is error free, the receive buffer circuit can immediately forward the extracted data to some external circuitry, such as a processor that handles upper OSI layer functions.

Assuming the extracted data is corrupted, the extracted data may be flushed from the receive buffer circuit to be replaced with corrected data provided by FEC processing, and the corrected (presumably error-free) data may then be forwarded to external circuitry.

Assuming the extracted data is corrupted and contains an incurable number of errors as determined by FEC processing, the extracted data in the receive buffer circuit may be flushed.

Accordingly, the receive buffer circuit (using commands derived from ARQ and FEC processing) can act as a form of data filter that removes corrupted data and forwards error-free data in an expedited fashion.

Figure 1:
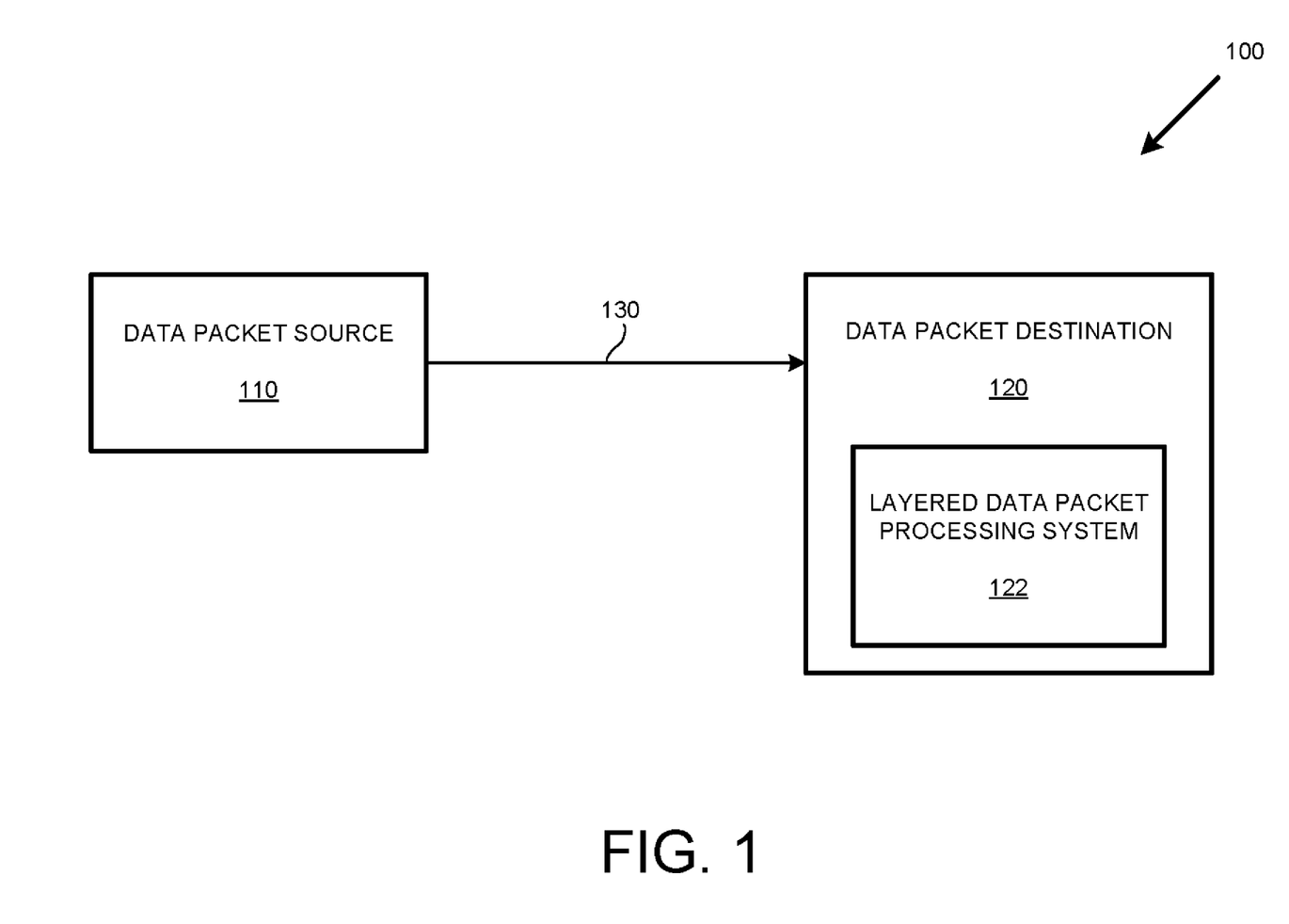
FIG. 1 depicts a communication system that uses an improved design to reduce Hybrid Automatic Repeat Request (HARQ) latency, according to one or examples of the present disclosure.

Turning now to the drawings, FIG. 1 depicts a communication system 100 that uses an improved HARQ approach that (as discussed above) reduces latency by virtue of rearranging the relationships between ARQ and FEC processing, according to one or more examples of the present disclosure.

As shown in FIG. 1, the communication system 100 includes a data packet source 110 and a data packet destination 120 with the data packet destination 120 including a layered data packet processing system 122. The data packet source 110 is communicatively coupled to the data packet destination 120 via a communication conduit 130.

As used herein "data packet" refers to an encapsulated unit of data created at the network layer of the OSI model. One of the most commonly encountered packets is the IP packet, which contains control information such as the source and destination IP addresses, differentiated services flags, and so on. For a transmitting device, data is first encapsulated within the packet, then sent out over some physical medium (e.g., wires or air) typically as some form of modulated bit stream. For a receiving device, the modulated data is sensed, and the physical bit stream is decoded, i.e., translated from modulated form back into a bit stream. For the purposes of this disclosure, the term "data package" refers to a portion of a packet, a single packet, or more than one packet.

The data packet source 110 and data packet destination 120 of the example of FIG. 1 may be any number of different communication systems configured to communication according to any number of protocols. For example, the message source 110 and message destination 120 may be cellular systems, ethernet-based systems, wireless network-based systems, and so on. Similarly, the communication conduit 130 may include any physical medium and combination of devices capable of communicatively coupling (directly or indirectly) a number of communication systems.

In operation, the data packet source 110 sends a number of data packets containing FEC coding to the data packet destination 120 via the communication conduit 130.

In response, the data packet destination 130 receives the data packets, decodes the received data packets to produce decoded data packets, then performs FEC detection on the decoded data packets. Assuming that data in the decoded data packets is not corrupted or can be corrected, then the data packet destination 120 will send a positive acknowledgement signal to the data packet source 110. In the present example, such positive acknowledgement signals are referred to using the acronym "ACK." In contrast, assuming that data in the decoded data packets is corrupted and cannot be corrected by FEC encoding, then the data packet destination 120 will send a negative acknowledgement signal to the data packet source 110. In the present example above, such negative acknowledgement signals are referred to using the acronym "NACK." However, the particular acronyms used are for explanation purposes only and are not meant to be limiting.

As is explained below, the presently disclosed methods and systems can be used to reduce the time used by the layered data packet processing system 122 to provide an appropriate ACK/NACK signal in response to receiving any given data packet from the data packet source 110. As is further explained below, the presently disclosed methods and systems can also be used to expedite error-free data to upper OSI layers of the data packet destination 120.

Figure 2:
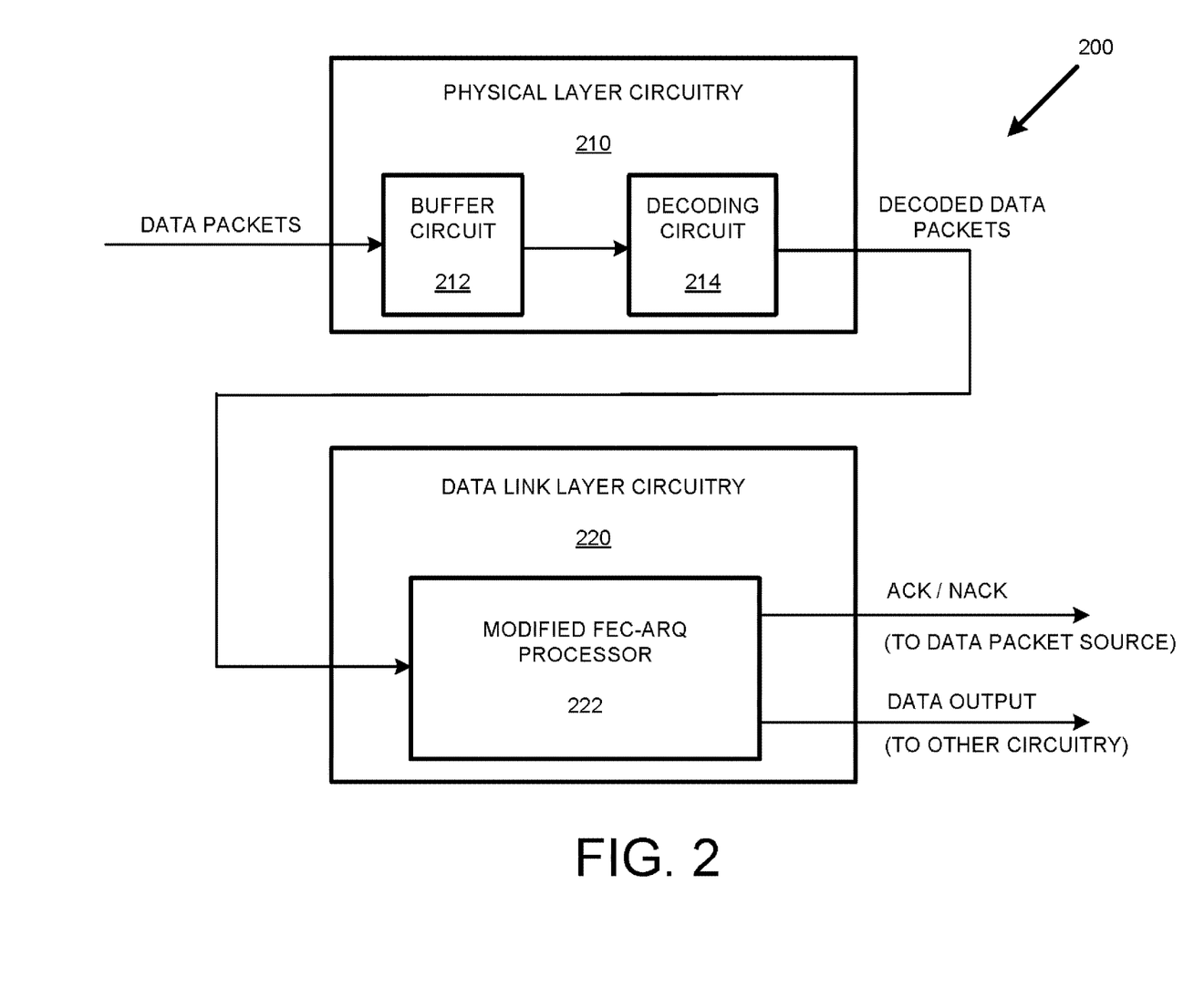
FIG. 2 is a diagram depicting portions of physical layer circuitry and data link layer circuitry designed to reduce HARQ latency, according to one or examples of the present disclosure.

FIG. 2 is a diagram depicting a portion of a data packet receiver 200 that includes physical layer circuitry 210 and data link layer circuitry 220 designed to reduce HARQ latency according to one or examples of the present disclosure. As shown in FIG. 2, the physical layer circuitry 210 includes a buffer circuit 212 and a decoding circuit 214, while the data link layer circuitry 220 includes a modified FEC-ARQ processor 222. As is further discussed below, the modified FEC-ARQ processor 222 of FIG. 2 provides an advantage by moving FEC processing to the data link layer circuitry 220 according to an improved architecture whereby parallel processing may be implemented.

In operation, the physical layer circuitry 210 receives data packets from some external source, such as the data packet source 110 of FIG. 1. As the physical layer circuitry 210 receives data packets, the buffer circuit 212 buffers the received data packets using any number of physical circuits to improve signal gain and noise reduction.

After data packets are buffered, the data packets are decoded using the decoding circuit 214 to produce decoded data packets. As "decoding" can take a large number of forms, for the purposes of this disclosure the term "decoding" may refer to any operations usable to convert information from some physical form (e.g., electromagnetic signals) to a stream of digital data.

After data packets are decoded, the decoded data packets are sent to the modified FEC-ARQ processor 222 in the data link layer circuitry 220 where the modified FEC-ARQ processor 222 performs error detection and error correction upon the decoded data packets so as to: (1) send the appropriate ACK/NACK signal to a data packet source and to (2) forward error-free data to some form of external circuitry, such as any number of discrete logic circuits or software/firmware-based circuits (e.g., a Central Processing Unit). As is further explained below with respect to FIG. 3, the modified FEC-ARQ processor 222 is structured so as to reduce ACK/NACK response latency while expediting error-free data to external circuitry.

Figure 3:
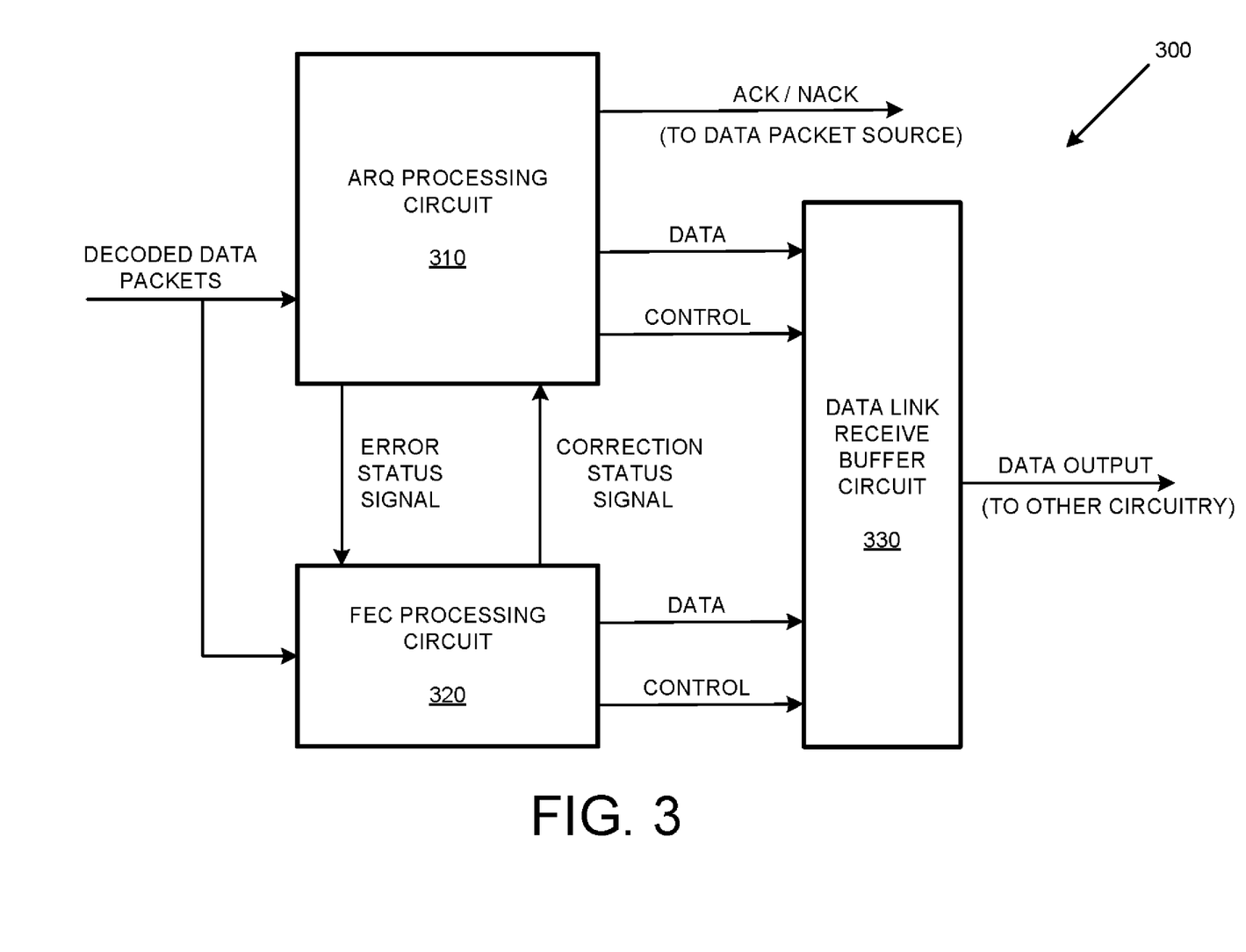
FIG. 3 is a block diagram of data link layer circuitry designed to reduce HARQ latency, according to one or examples of the present disclosure.

FIG. 3 is a block diagram of an example FEC-ARQ processor 300 designed to reduce ARQ latency, according to one or examples of the present disclosure. As is shown in FIG. 3, the example FEC-ARQ processor 300 includes an ARQ processing circuit 310, an FEC processing circuit 320, and a data link receive buffer circuit 330.

In operation, decoded data packets are received from an external device, such as the physical layer circuitry 210 of FIG. 2. It is to be appreciated that, in the example of FIG. 3, the circuitry is structured such that the ARQ processing circuit 310 and the FEC processing circuit 320 can receive decoded data packets from the physical layer circuitry in parallel/at the same time. Accordingly, it is to be appreciated that the FEC processing circuit 320 can perform error correction at the same time (at least in part) as the ARQ processing circuit 310 performs error detection and provides ACK/NACK signals to an external (transmitting) device. It is this parallel processing that, at least in part, contributes to the improved HARQ latency issue discussed herein.

In various examples, as the ARQ processing circuit 310 receives a particular decoded data packet, the ARQ processing circuit 310 performs an error detection process on the particular decoded data packet. In such examples the ARQ processing circuit then sends an "error status signal" to the FEC processing circuit 320 to indicate whether or not a particular decoded data packet contains an error in response to the ARQ processing circuit 310 detecting an error in the particular decoded data packet.

As an alternative to addressing individual data packets, the ARQ processing circuit 310 may perform error detection on a data package.

Similarly, as the FEC processing circuit 320 receives decoded data packets, the FEC processing circuit 320 can perform some form of error correction on the decoded data packets, and provide some form of "correction status signal" to the ARQ processing circuit 310 indicating whether or not a particular decoded data packet received from the physical layer circuitry contains errors that cannot be corrected.

As an alternative to addressing individual data packets, the FEC processing circuit 320 may perform error correction on a data package basis. By way of example, if a data package consists of ten data packets using a single FEC code, the FEC processing circuit 320 may perform error correction on all ten data packets even if error detection is performed on a data packet basis.

In various examples, the FEC processing circuit 320 is adaptive and can perform any number of different FEC algorithms designed to provide the best bandwidth and latency profile using adaptive FEC techniques. Since not all communication mediums/channels may have the same FEC requirements based on their physical characteristics (e.g., noise and multipath issues), the FEC processing circuit 320 optionally may be configured to incorporate an FEC solution based on, for example, measured error rates. Such a configured FEC solution could be that which provides just enough data correction strength to allow an associated ARQ protocol to achieve the maximum bandwidth possible. This adaptive approach also affects FEC decoder processing time since stronger FEC are expected to use more processing time.

In certain examples, the effect of any error detection of the ARQ processing circuit 310 can affect the operation of FEC processing circuit 320. For instance, should an error status signal sent by the ARQ processing circuit 310 to the FEC processing circuit 320 indicate that a particular decoded data packet contains no error, the FEC processing circuit 320 may respond by performing no error correction or stopping any ongoing error correction. On the other hand, in other examples, it may be useful to allow the FEC processing circuit 320 to continue performing error correction assuming that it is desired or useful to use higher data integrity standards given that multiple bit errors might result in an erroneous error detection result by the ARQ processing circuit 310.

As the FEC processing circuit 320 performs error correction processing, the FEC processing circuit 320 may send a "correction status signal" to the ARQ processing circuit 310. Should the correction status signal indicate that the particular decoded data packet is excessively corrupted and cannot be corrected, then in response the ARQ processing circuit 310 can send a request (e.g., a NACK signal) that a data packet corresponding to the particular decoded data packet at issue be retransmitted.

In addition to performing error detection, the ARQ processing circuit 310 can also extract data from decoded data packets to produce extracted data, which may be forwarded to the data link receive buffer circuit 330. Accordingly, the data link receive buffer circuit 330 may later forward the extracted data to an external device, or in the alternative flush the extracted data should the ARQ processing circuit 310 and/or the ARQ processing circuit 310 indicate that the extracted data is corrupted (i.e., an error is detected).

Similarly, the FEC processing circuit 320 can also extract data from decoded data packets to produce extracted data, and provide the extracted data to the data link receive buffer circuit 330. However, unlike the ARQ processing circuit 310, the extracted data of the FEC processing circuit 320 may be the result of error correction (i.e., errors are removed).

Should the FEC processing circuit 320 determine that there are data errors in any data provided by the ARQ processing circuit 310 and/or there are data errors that are incurable, then the FEC processing circuit 320 can command the data link receive buffer circuit 330 to flush any data relating to a corrupted packet. Otherwise, should the FEC processing circuit 320 determine that there are no data errors in any data provided by the ARQ processing circuit 310 and/or there are data errors that can be corrected by the FEC processing circuit 320, the FEC processing circuit 320 may command the data link receive buffer circuit 330 to forward any data to some form of external circuitry.

Thus, the receive buffer circuit 330 can, using commands from the ARQ processing circuit 310 and/or the FEC processing circuit 320, act as a data filter to remove/flush corrupted data while allowing error-free data to be provided to external circuitry (e.g., upper OSI layers) in an expedited fashion. Accordingly, internal processing delays in any receiving device are reduced by virtue of the interactions between the ARQ processing circuit 310, the FEC processing circuit 320, and the receive buffer circuit 330.

Figure 4A:
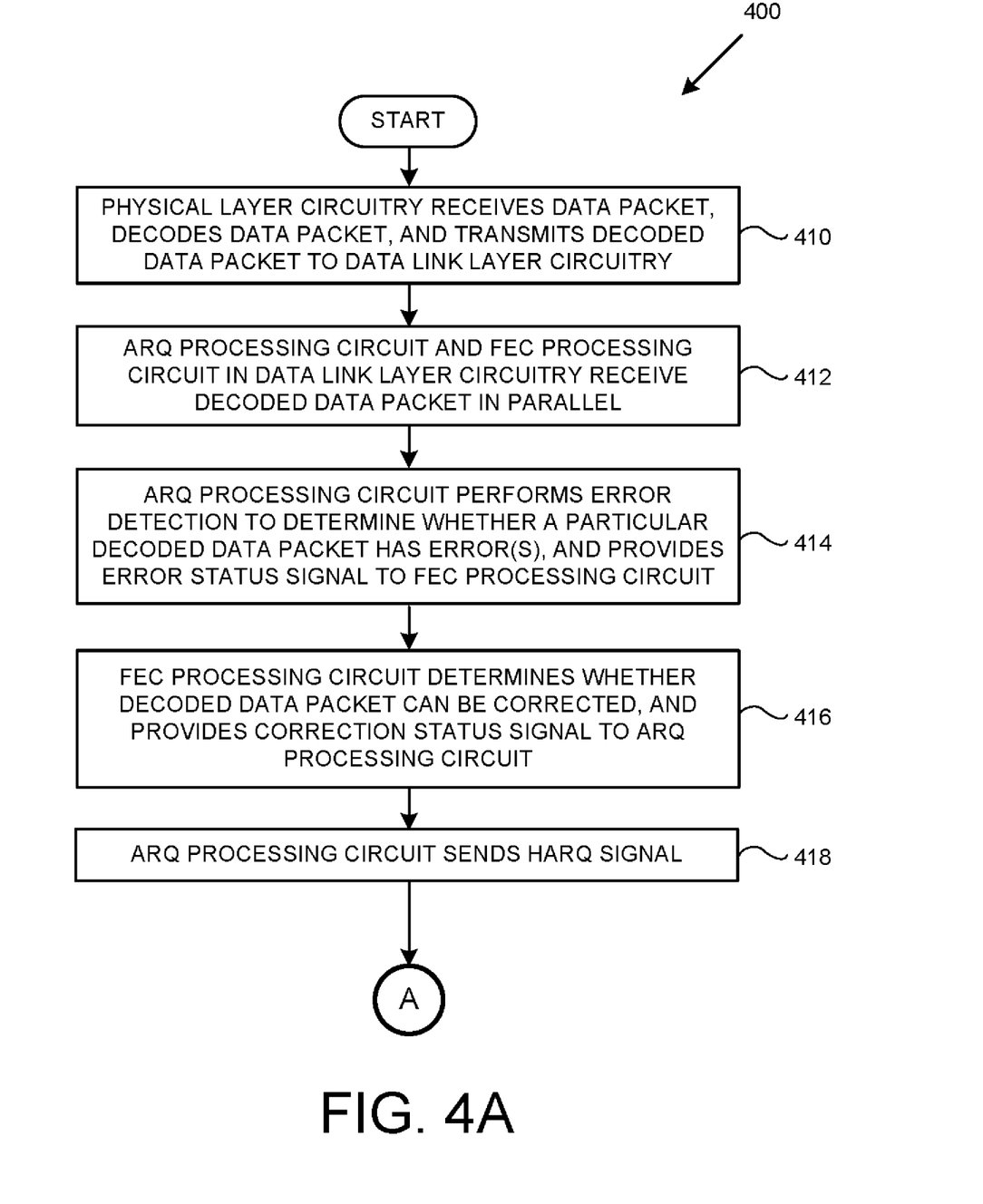
FIGS. 4A-4B together depict a flowchart of a method usable to reduce HARQ latency, according to one or examples of the present disclosure.
Figure 4B:
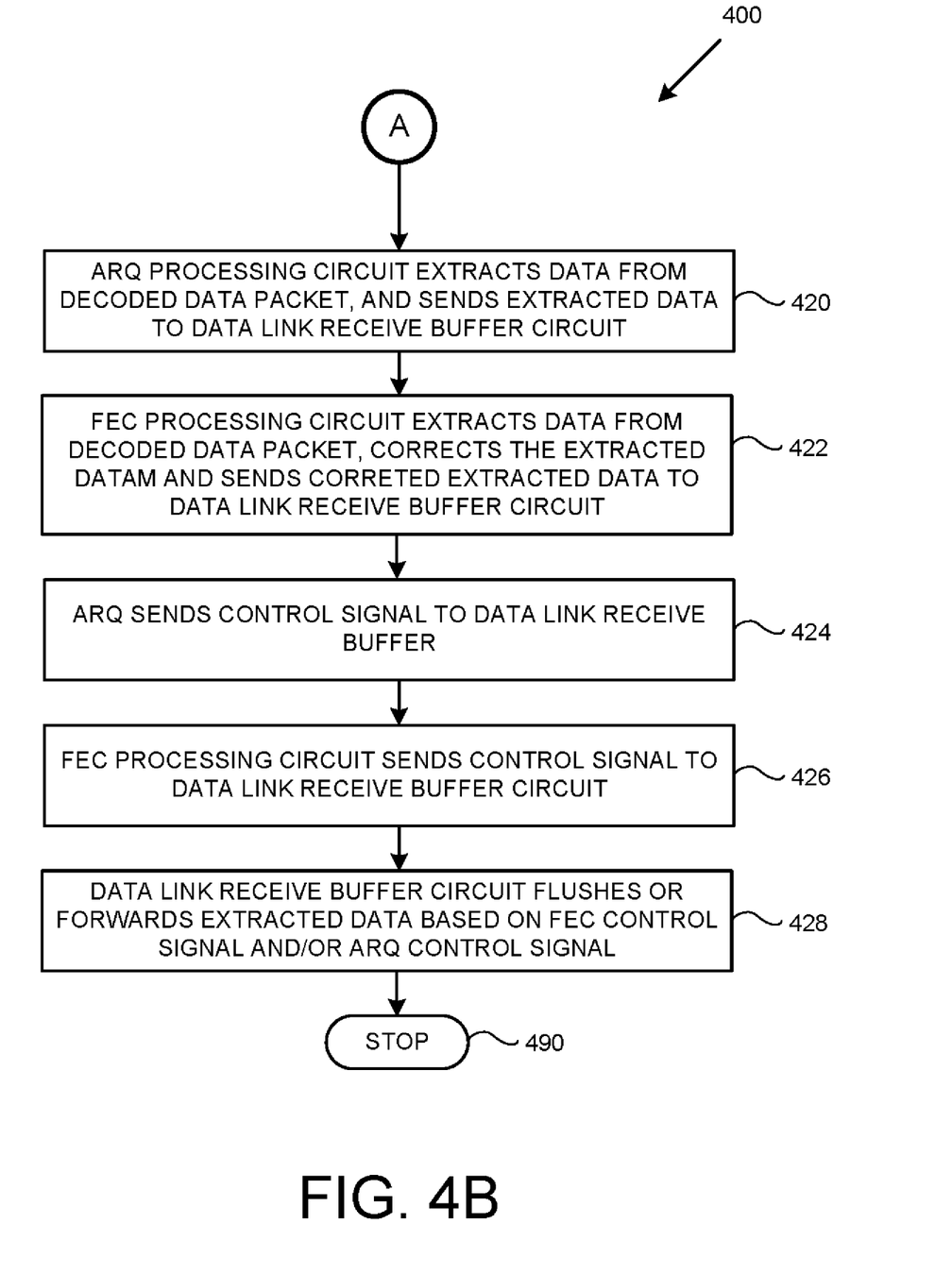

FIGS. 4A-4B together depict a flowchart of a method 400 usable to reduce HARQ latency, according to one or examples of the present disclosure. It is to be appreciated to those skilled in the art in light of this disclosure that, while the various operations of FIG. 4 are shown according to a particular order for ease of explanation, that certain operations may be performed in different orders or performed in a parallel fashion. It is to be further appreciated that certain operations may be omitted.

The method 400 starts in operation 410 where some form of physical layer circuitry receives data packets, decodes the data packets, and transmits the decoded data packets to data link layer circuitry, which in the present example includes an ARQ processing circuit and an FEC processing circuit.

In operation 412, the ARQ processing circuit and the FEC processing circuit receive the decoded data packets in parallel, which as discussed above allows ARQ and FEC processes to be conducted in parallel (i.e., at least in part at the same time given FEC processes are expected to take longer than ARQ processes).

In operation 414, the ARQ processing circuit performs error detection so as to determine whether or not a particular decoded data packet (or data package) has one or more errors, where after the ARQ processing circuit provides an error status signal to the FEC processing circuit. As discussed above, in some examples an indication from the ARQ processing circuit may optionally stop error correction by the FEC processing circuit.

In operation 416, the FEC processing circuit performs error correction and determines whether or not the particular decoded data packet (or data package) can be corrected to remove all errors. Subsequently, the FEC processing circuit provides a correction status signal to the ARQ processing circuit that indicates whether or not the particular decoded data packet contains one or more incurable errors, i.e., errors that cannot be corrected.

In operation 418, the ARQ processing circuit sends an appropriate HARQ signal to the source of the received data packets either in response to, for example, whether data errors were detected by the ARQ processing circuit, whether data errors were detected by the FEC processing circuit, or whether the correction status signal from the FEC processing circuit indicates that one or more errors could not be successfully corrected.

Turning to FIG. 4B, in operation 420, the ARQ processing circuit extracts data from the decoded data packets and sends/forwards the extracted data to a data link receive buffer circuit.

In operation 422, in addition to or in alternative to operation 420, the FEC processing circuit extracts data from the decoded data packets, performs error correction on the extracted data, and send/forwards the corrected data to a data link receive buffer circuit.

In operation 424, the ARQ processing circuit sends a command {e.g., control signal} to the data link receive buffer circuit to either flush the extracted data or to forward the extracted data to external circuitry.

In operation 426, in addition to or in alternative to operation 420, the FEC processing circuit sends a command to the data link receive buffer circuit to either flush the extracted data or to forward the extracted data to external circuitry.

In operation 428, in response to one or both of the command of operations 424 and 426, the data link receive buffer circuit to either flushes the extracted data or forwards the extracted data to external circuitry. The example method 400 then stops at operation 490.

Figure 5:
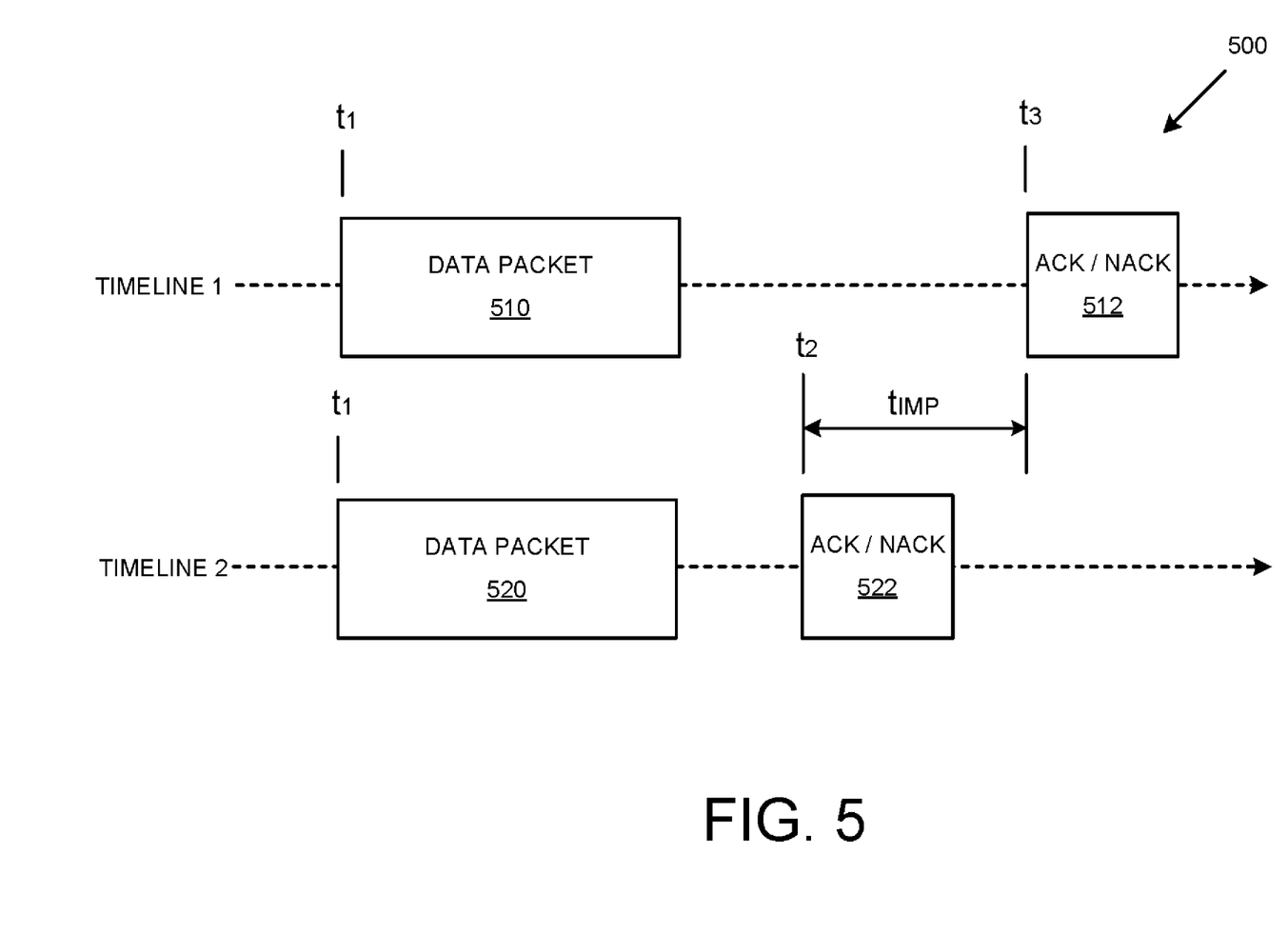
FIG. 5 depicts example timelines that demonstrate the reduced HARQ latency of the disclosed methods and devices, according to one or examples of the present disclosure.

FIG. 5 is a depiction 500 of two example timelines {Timeline1, Timeline 2} that together demonstrate the advantage of reduced HARQ latency as compared to other HARQ-based systems. Timeline 1 is representative of methods and devices that do not take advantage of the parallel HARQ processing approach discussed above, while Timeline 2 is representative of methods and devices that do take advantage of the above-discussed parallel HARQ processing. As shown in FIG. 5, for Timeline 1 a first data packet 510 is transmitted/received at time $t_1$ where after an appropriate ACK/NACK signal 512 is produced at time $t_3$. In contrast, Timeline 2 represents a comparative timing of a data packet transmitted at time $t_1$ and where the appropriate ACK/NACK signal 512 is produced at time $t_2$. Given the improvement in response ($t_{IMP}$) it is apparent that HARQ latency may be substantially decreased. The decrease in HARQ latency in turn, generally allows for faster data throughput as the time between data packet transmissions is reduced.

While not apparent from FIG. 5 it is to be appreciated that the improvement in response ($t_{IMP}$) also represents an improvement in time that data, such as extracted data stored in the receive buffer circuit 330 of FIG. 3, can be forwarded to some form of external (e.g., higher OSI layer) circuitry for further processing. Accordingly, internal processing delays in any receiving device are reduced.

In various examples the above-described systems and/or methods may be implemented using any form of known or later-developed circuitry (e.g., electronic, optical) or programmable device, such as a computer-based system or programmable logic. It should be appreciated that the above-described systems and methods can be implemented using any of various known or later developed programming/scripting languages, such as "Perl," "Object Pascal," "Pascal" "SQL," "C," "C++," "FORTRAN," "Python," "VHDL" and the like.

Accordingly, various storage media, such as magnetic computer disks, optical disks, electronic memories or any other form of non-transient computer-readable storage memory, can be prepared that can contain information and instructions that can direct a device, such as a computer, to implement the above-described systems and/or methods. Such storage devices can be referred to as "computer program products" for practical purposes. Once an appropriate device has access to the information and programs contained on the storage media/computer program product, the storage media can provide the information and programs to the device, thus enabling the device to perform the above-described systems and/or methods. Unless otherwise expressly stated, "storage medium" is not an electromagnetic wave per se.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to database-related services.

While the methods and systems above are described in conjunction with specific examples, it is evident that many alternatives, modifications, and variations will be apparent to those skilled in the art. Accordingly, the examples above as set forth herein are intended to be illustrative, not limiting. There are changes that may be made without departing from the scope of the present disclosure.

What is claimed is:

1. A system, comprising:
physical layer circuitry to receive data packets via a physical medium, and decode the received data packets to produce decoded data; and
data link layer circuitry communicatively coupled to the physical layer circuitry, the data link layer circuitry including:
an Automatic Repeat reQuest (ARQ) processing circuit to send requests for retransmitting the data packets, and
a Forward Error Correction (FEC) processing circuit to receive the decoded data from the physical layer circuitry, to perform error correction on the decoded data received from the physical layer circuitry, and to provide a correction status signal to the ARQ processing circuit indicating whether the decoded data received from the physical layer circuitry contains one or more incurable errors;
wherein the data link layer circuitry is structured such that the ARQ processing circuit and the FEC processing circuit receive the decoded data from the physical layer circuitry in parallel.

2. The system of claim 1, wherein:
the ARQ processing circuit detects errors in the decoded data; and
the ARQ processing circuit sends an error status signal to the FEC processing circuit to indicate whether the decoded data contains an error in response to the ARQ processing circuit detecting an error in the decoded data.

3. The system of claim 2, wherein:
the FEC processing circuit stops performing error correction on the decoded data in response to the error status signal indicating that the decoded data contains no error.

4. The system of claim 2, wherein:
the FEC processing circuit continues to perform error correction on the decoded data regardless of whether or not the error status signal indicates that the decoded data contains no error.

5. The system of claim 2, wherein:
the FEC processing circuit sends a correction status signal to the ARQ processing circuit indicating whether the decoded data contains incurable errors.

6. The system of claim 5, wherein:
the FEC processing circuit performs error correction, at least in part, at a same time as the ARQ processing circuit performs error detection.

7. The system of claim 5, wherein:
the ARQ processing circuit sends a request that at least one data packet corresponding to the decoded data be retransmitted in response to the correction status signal indicating that the decoded data contains incurable errors.

8. The system of claim 7, wherein the ARQ processing circuit further extracts data from the decoded data to produce extracted data.

9. The system of claim 8, wherein the data link layer circuitry further includes a data link receive buffer circuit communicatively coupled to the ARQ processing circuit so as to receive the extracted data from the ARQ processing circuit.

10. The system of claim 9, wherein the data link layer circuitry either flushes the extracted data or forwards the extracted data to other circuitry based on at least one of a command from the FEC processing circuit and a command from the ARQ processing circuit.

11. The system of claim 1, wherein the FEC processing circuit further extracts data from the decoded data to produce extracted data.

12. The system of claim 11, wherein the data link layer circuitry further includes a data link receive buffer circuit communicatively coupled to the FEC processing circuit so as to receive the extracted data from the FEC processing circuit.

13. The system of claim 12, wherein the data link receive buffer circuit either flushes the extracted data or forwards the extracted data to external circuitry based on at least a command from the FEC processing circuit.

14. A method comprising:
receiving data packets and decoding the received data packets to produce decoded data using physical layer circuitry;
receiving the decoded data by a Forward Error Correction (FEC) processing circuit located in data link processing circuitry;
performing error correction on the decoded data using the FEC processing circuit;
transmitting a correction status signal to an Automatic Repeat reQuest (ARQ) processing circuit indicating whether the decoded data contains one or more incurable errors, the ARQ processing circuit being part of the data link processing circuitry;
receiving the decoded data by the ARQ processing circuit, wherein the decoded data is received in parallel by the ARQ processing circuit and the FEC processing circuit; and
sending a Hybrid Automatic Repeat reQuest (HARQ) signal by the ARQ processing circuit based on the correction status signal.

15. The method of claim 14, further comprising:
detecting errors in the decoded data by the ARQ processing circuit;
sending an error status signal to the FEC processing circuit to indicate that the decoded data contains no error in response to detecting no errors in the decoded data; and
stopping error correction by the FEC processing circuit in response to the error status signal indicating that the decoded data contains no error.

16. The method of claim 14, further comprising:
sending an error status signal by the ARQ processing circuit to the FEC processing circuit to indicate that the decoded data contains an error;
sending a correction status signal from the FEC processing circuit to the ARQ processing circuit to indicate that the decoded data contains at least one incurable error; and sending a request by the ARQ processing circuit to cause one or more data packets corresponding to the decoded data to be retransmitted in response to the correction status signal indicating that the decoded data contains at least one incurable error.

17. The method of claim 14, further comprising:

extracting data from the decoded data by the ARQ processing circuit to produce extracted data;

transmitting the extracted data to a data link receive buffer circuit communicatively coupled to the ARQ processing circuit;

forwarding the extracted data from the data link receive buffer circuit to other circuitry in response to a command from the FEC processing circuit indicating the extracted data contains no errors; and flushing the extracted data by the data link receive buffer circuit in response to a command from at least one of the ARQ processing circuit and the FEC processing circuit indicating that the extracted data contains one or more errors.

18. A device, comprising:

an Automatic Repeat reQuest (ARQ) processing circuit to receive decoded data from physical layer circuitry, to perform error detection on the received decoded data, and to send requests for retransmitting data packets, and a Forward Error Correction (FEC) processing circuit to receive the decoded data from the physical layer circuitry in parallel with the ARQ processing circuit, to perform error correction on the decoded data received from the physical layer circuitry, and to provide a correction status signal to the ARQ processing circuit indicating whether a decoded data package consisting of one or more data packets received from the physical layer circuitry contains one or more incurable errors.

* * * * *